(12) United States Patent
Pedersen et al.

(10) Patent No.: US 7,473,876 B1
(45) Date of Patent: Jan. 6, 2009

(54) BOOST PHASE INTERCEPT MISSILE FIRE CONTROL SYSTEM ARCHITECTURE

(75) Inventors: Christian E. Pedersen, Browns Mills, NJ (US); Jeffrey B. Boka, Lumberton, NJ (US); Naresh R. Patel, Bellmawr, NJ (US); Peter N. Bishop, Moorestown, NJ (US); Carl J. Bauer, Mt. Laurel, NJ (US); Koeunyi Bae, Sicklerville, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 80 days.

(21) Appl. No.: 11/430,647

(22) Filed: May 9, 2006

(51) Int. Cl.
  *F42B 15/01* (2006.01)
  *G06F 19/00* (2006.01)
  *F41G 7/00* (2006.01)
(52) U.S. Cl. ............... 244/3.1; 342/61; 342/62; 342/175; 342/195; 89/1.11
(58) Field of Classification Search ........... 244/3.1–3.3; 89/1.11, 1.818; 342/61–68, 175, 195, 73–81, 342/89–103, 118, 146–148, 190, 149, 59; 367/118; 706/12, 13; 382/181, 190, 195, 382/199, 224, 226–228; 702/127, 141–144, 702/149–153
See application file for complete search history.

(56) References Cited

U.S. PATENT DOCUMENTS

| | | | | | |
|---|---|---|---|---|---|
| 3,982,713 | A | * | 9/1976 | Martin | 244/3.1 |
| 4,093,153 | A | * | 6/1978 | Bardash et al. | 244/3.14 |
| 4,925,129 | A | * | 5/1990 | Salkeld et al. | 244/3.11 |
| 5,050,818 | A | * | 9/1991 | Sundermeyer | 244/3.15 |
| 5,170,440 | A | * | 12/1992 | Cox | 382/199 |
| 5,198,607 | A | * | 3/1993 | Livingston et al. | 89/1.11 |
| 5,340,056 | A | * | 8/1994 | Guelman et al. | 244/3.16 |
| 5,379,044 | A | * | 1/1995 | Carlson et al. | 342/90 |
| 5,414,643 | A | * | 5/1995 | Blackman et al. | 342/95 |
| 5,429,322 | A | * | 7/1995 | Waymeyer | 244/3.15 |
| 5,458,041 | A | * | 10/1995 | Sun et al. | 89/1.11 |
| 5,464,174 | A | * | 11/1995 | Laures | 244/3.11 |
| 5,471,433 | A | * | 11/1995 | Hammell et al. | 367/118 |

(Continued)

FOREIGN PATENT DOCUMENTS

WO  WO 98/58274 A1 * 12/1998

OTHER PUBLICATIONS

T. Wigren et al, "Operational Multi-Sensor Tracking For Air Defense"; IEEE Publication 0-7803-3601-1/96/$5.00; copyright in the year 1996.*

(Continued)

*Primary Examiner*—Bernarr E Gregory
(74) *Attorney, Agent, or Firm*—Duane Morris LLP

(57) ABSTRACT

A fire control system for a boost phase threat missile includes sensors for generating target-missile representative signals, and a multi-hypothesis track filter, which estimates the states of various target hypotheses. The estimated states are typed to generate hypotheses and their likelihoods. The states, hypotheses and likelihoods are applied to a multihypothesis track filter, and the resulting propagated states are applied to an engagement planner, together with the hypotheses and likelihoods. The engagement planner initializes the interceptor(s). Interceptor guidance uses the initialization and the propagated states and typing information to command the interceptor.

7 Claims, 10 Drawing Sheets

U.S. PATENT DOCUMENTS

| | | | | |
|---|---|---|---|---|
| 5,506,586 A * | 4/1996 | Bull | | 342/148 |
| 5,660,355 A * | 8/1997 | Waymeyer | | 244/3.15 |
| 5,757,310 A * | 5/1998 | Millward | | 342/95 |
| 5,765,166 A * | 6/1998 | Gotfried et al. | | 342/190 |
| 5,793,931 A * | 8/1998 | Hillis | | 706/13 |
| 5,862,496 A * | 1/1999 | Biven | | 244/3.15 |
| 6,043,867 A * | 3/2000 | Saban | | 244/3.11 |
| 6,064,332 A * | 5/2000 | Cloutier | | 342/62 |
| 6,091,361 A * | 7/2000 | Davis et al. | | 342/195 |
| 6,278,401 B1 * | 8/2001 | Wigren | | 342/195 |
| 6,314,204 B1 * | 11/2001 | Cham et al. | | 382/228 |
| 6,527,222 B1 * | 3/2003 | Redano | | 244/3.14 |
| 6,549,158 B1 * | 4/2003 | Hanson | | 342/195 |
| 6,561,074 B1 * | 5/2003 | Engel et al. | | 89/1.818 |
| 6,563,450 B1 * | 5/2003 | Wallace | | 342/100 |
| 6,603,421 B1 * | 8/2003 | Schiff et al. | | 342/96 |
| 6,666,401 B1 * | 12/2003 | Mardirossian | | 244/3.11 |
| 6,674,390 B1 * | 1/2004 | Murphy, Jr. | | 342/89 |
| 6,720,907 B1 * | 4/2004 | Miron | | 342/195 |
| 6,771,205 B1 * | 8/2004 | Barton et al. | | 342/149 |
| 6,799,138 B2 * | 9/2004 | Lawrence et al. | | 702/141 |
| 6,877,691 B2 * | 4/2005 | DeFlumere et al. | | 244/3.16 |
| 7,394,047 B1 * | 7/2008 | Pedersen | | 244/3.1 |
| 2004/0004155 A1 * | 1/2004 | DeFlumere et al. | | 244/3.11 |

OTHER PUBLICATIONS

S.S. Blackman, "Multiple Hypothesis Tracking for Multiple Target Tracking"; IEEE A&E Systems Magazine; vol. 19, No. 1; Jan. 2004; pp. 5-18.*

K.C. Chang et al, "Evaluating a Multiple-Hypothesis Multitarget Tracking Algorithm"; IEEE Trans. on Aerospace and Electronic Systems; vol. 30, No. 2; Apr. 1994; pp. 578-590.*

U.S. Appl. No. 11/072,902, filed Mar. 4, 2005, in the name of Boka et al.

* cited by examiner

| Column 1 Engagement Rank | Column 2 Composite FOM | Column 3 Intercept Time | Column 4 | Column 5 Launch Time |
|---|---|---|---|---|
| 1 | 0.987 | 113.78 | ... | 61.32 |
| 2 | 0.978 | 115.89 | ... | 70.96 |
| 3 | 0.947 | 123.24 | ... | 75.03 |
| 4 | 0.918 | 80.23 | ... | 31.86 |
| 5 | 0.882 | 75.94 | ... | 26.79 |
| 6 | 0.841 | 62.87 | ... | 16.41 |
| 7 | 0.763 | 58.07 | ... | 7.95 |
| 8 | 0.642 | 134.83 | ... | 88.00 |
| 9 | 0.501 | 136.94 | ... | 87.82 |
| ... | | | | |

FIG. 8

BOOST PHASE INTERCEPT MISSILE FIRE CONTROL SYSTEM ARCHITECTURE

FIELD OF THE INVENTION

This invention relates to defense against ballistic missiles in their boost phase, and more particularly to arrangements for planning and executing the engagement of the ballistic missiles.

BACKGROUND OF THE INVENTION

Defenses against ballistic missiles are currently concentrating upon the boost phase of the ballistic missile, which is a phase at which multiple warheads andor countermeasures have not as yet been deployed. Intercepting a ballistic missile before it can deploy complicated countermeasures andor multiple warheads greatly decreases the burden on sensors to distinguish lethal payload object(s) from countermeasures. The concept involves having interceptor assets at a location near the expected launch sites of threatening offensive ballistic missiles, sensing the presence of the threat missile soon after launch, calculating its expected trajectory, and launching interceptor asset(s) to intercept the threat missile. It will be understood that initially, a defender sensing the launch of a ballistic missile does not know exactly when it was launched, the type of missile which has been launched (although there may be some knowledge of the missile types available at the launch site), its mass, thrust, and intended trajectory. In fact, very little is initially known. Unlike engagements of threat missiles in their mid-course phase, where the trajectory of such threat missiles is well defined by Keplerian orbits, uncertainty in the trajectory of a boosting missile is a major factor in defeating such a threat missile.

Defeating threat missiles in their boost phase requires methods to filter sensor measurements and establish track states, to determine the type of a threat missile, to propagate the threat missile's state into the future, to plan an engagement against a threat missile, and to guide an interceptor to destroy the threat missile. An engagement planner for boost phase intercepts must weigh the capability of the interceptor against the uncertainty in the trajectory of the boosting threat missile.

The problem of defense against a boosting threat missile is further exacerbated by the lack of knowledge of the threat missile's trajectory, as one can only plan an interceptor missile launch if one knows which interceptor missile, among several, is in a position from which it can be expected to make a successful interception.

Missile defense arrangements that are adequate for engaging threat missile(s) in its (their) mid-course phase may not be adequate for engaging threat missiles in their boost phase. Improved or alternative boost phase missile defense arrangements are desired.

SUMMARY OF THE INVENTION

A method for intercepting a ballistic target missile in its boost phase comprises the steps of using multiple target hypotheses to estimate the state of the target missile, and to generate estimated target missile states. The estimated target missile states are propagated to produce propagated target missile states, and an intercept of the target missile is planned from the propagated target missile states. One mode of this method further comprises the step of guiding an interceptor missile to intercept the target missile, preferably according to the intercept plan. The step of guiding may include the steps of generating interceptor missile states and propagating the interceptor missile states. A yet further mode of this method comprises, between the steps of using multiple target hypotheses to estimate the state of the target missile and propagating the estimated target missile states, the step of estimating the likelihood of a target hypothesis being correct. This step of estimating the likelihood is performed in order to improve the steps of (a) propagating the estimated target missile states and (b) planning an intercept of the target missile.

A method according to another aspect of the invention is for intercepting a target missile in it's boost phase. The method comprises the steps of generating sensed signals representing the target missile, and applying the sensed signals to a track filter to generate multiple hypotheses of the target missile states. The multiple hypotheses of the target missile states are typed to thereby generate likelihoods of the hypotheses being correct. The multiple hypotheses of the target missile states are propagated to thereby generate multiple propagated states of the target missile. An engagement of the target missile is planned using the likelihoods, the multiple propagated states, and information relating to at least one available interceptor missile. The guidance of the interceptor missile is controlled using the planned engagement, the likelihood information, the multiple propagated states of the target missile, and interceptor missile state information.

A method according to an aspect of the invention for boost phase engagement planning against target missiles in their boost phase comprises the steps of sensing a target missile(s) to produce target-representative signals representing at least target missile position, and applying the target-representative signals to a multi-hypothesis filter for producing at least position, velocity, and mass flow rate information defining the state of the target missile. Ideally, this position, velocity, and mass flow rate information is smoothed. The position, velocity, and mass flow rate information is typed to assign probabilities to various hypotheses of the target missile type. The state of the target missile is propagated forward in time to produce a plurality of propagated target missile state hypotheses. An interceptor having known characteristics is chosen. An interceptor missile launch time and an estimated time of intercept are chosen from the target missile states, the likelihoods, and the known characteristics of the interceptor missile. The interceptor is launched at the chosen launch time. The interceptor missile is guided to intercept using the probabilities to the various hypotheses of the target missile type and the plurality of propagated target missile state hypotheses. A particular mode of this method includes, following the step of choosing a launch time and an estimated time to intercept, the further step of initializing the interceptor with initial guidance information derived from the target missile states, the likelihoods, and the known characteristics of the interceptor missile.

BRIEF DESCRIPTION OF THE DRAWING

FIG. 8 illustrates an Engagement Opportunity List; and

DESCRIPTION OF THE INVENTION

Figure 1:
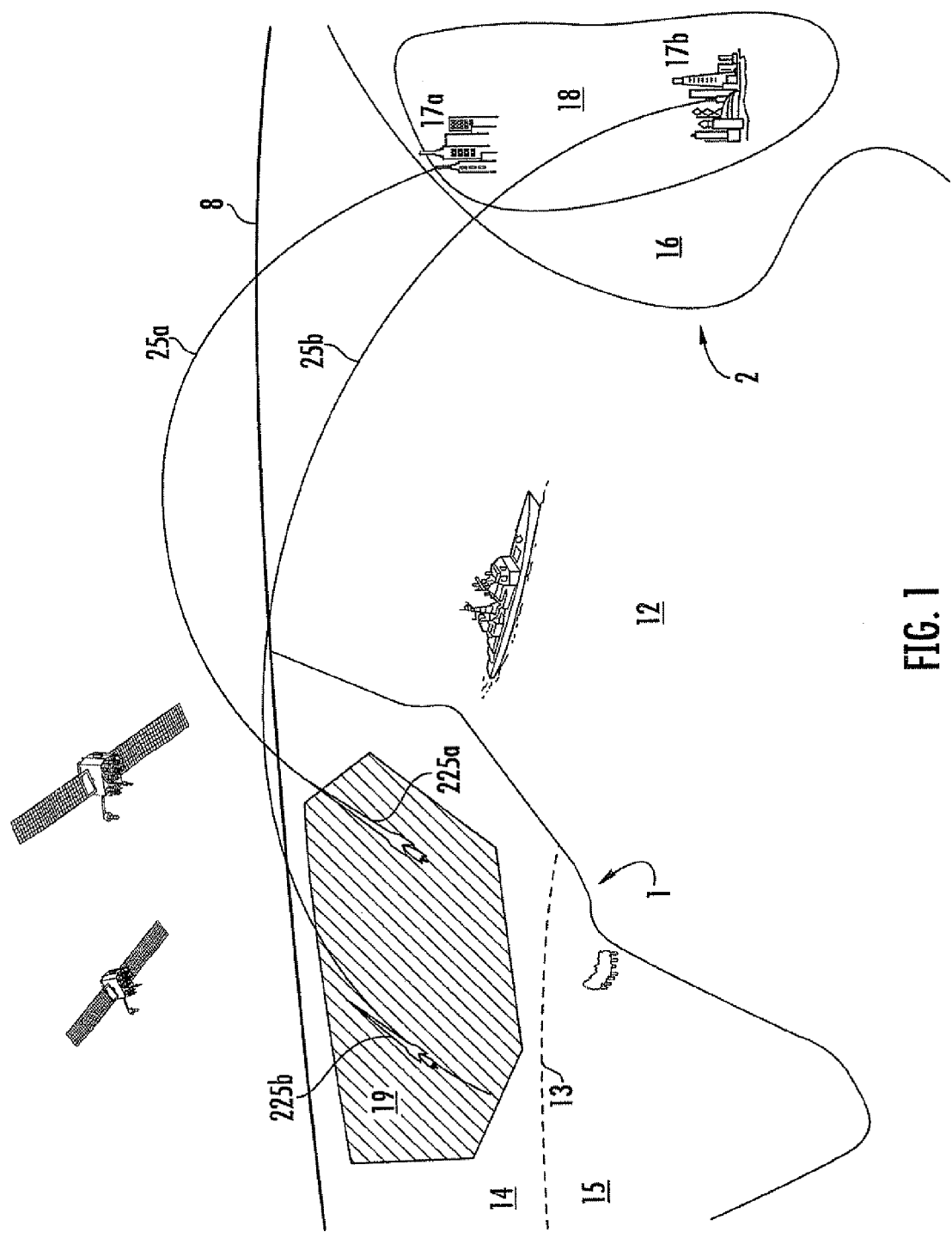
FIG. 1 is a simplified diagram illustrating a scenario in which a ballistic missile is launched and takes a trajectory, and countermeasures sense the launch and provide boost phase fire control for estimating the future location of the threat missile, planning the engagement of the threat missile, and for controlling an interceptor missile.

FIG. 1 is a simplified representation of the ballistic missile defense (BMD) problem, showing a region of water between two land masses, and also showing a defended area and locations from which attacking missiles can or might be launched. The physical problem can be understood by reference to FIG. 1, showing a portion of the Earth's surface and the horizon 8. In FIG. 1, a sea region 12 lies between two land masses 1 and 2. Land mass 1 is a peninsula including both enemy territory 14 and friendly territory 15 separated by the border 13, and land mass 2 includes friendly cities 17*a* and 17*b*. A defended region is designated 18. The operating region for sea-based defensive platforms lies in sea area 12. The operating region for land-based defensive assets lies in friendly territory 15 sufficiently close to the expected launch sites of the enemy missiles to intercept them in their boost phase. The adversary is expected to launch ballistic missiles, if at all, from the launch area designated 19. The missiles, when launched, fly along trajectories, designated generally as 25*a* and 25*b*, to the set of defended cities 17*a* and 17*b*. A set of assets is assigned the mission to protect these defended areas. Each asset type (e.g. land based, sea based, space based) is constrained to operate within some pre-specified region. These regions, known as operating areas, satisfy several operational constraints. For land-based systems, the sensors and interceptors must be located on suitable terrain, away from enemy territory. Sea-based sensors and interceptors are located away from commercial shipping lanes and littoral areas controlled by the adversary. Space based assets are constrained to specific orbits.

Figure 2:
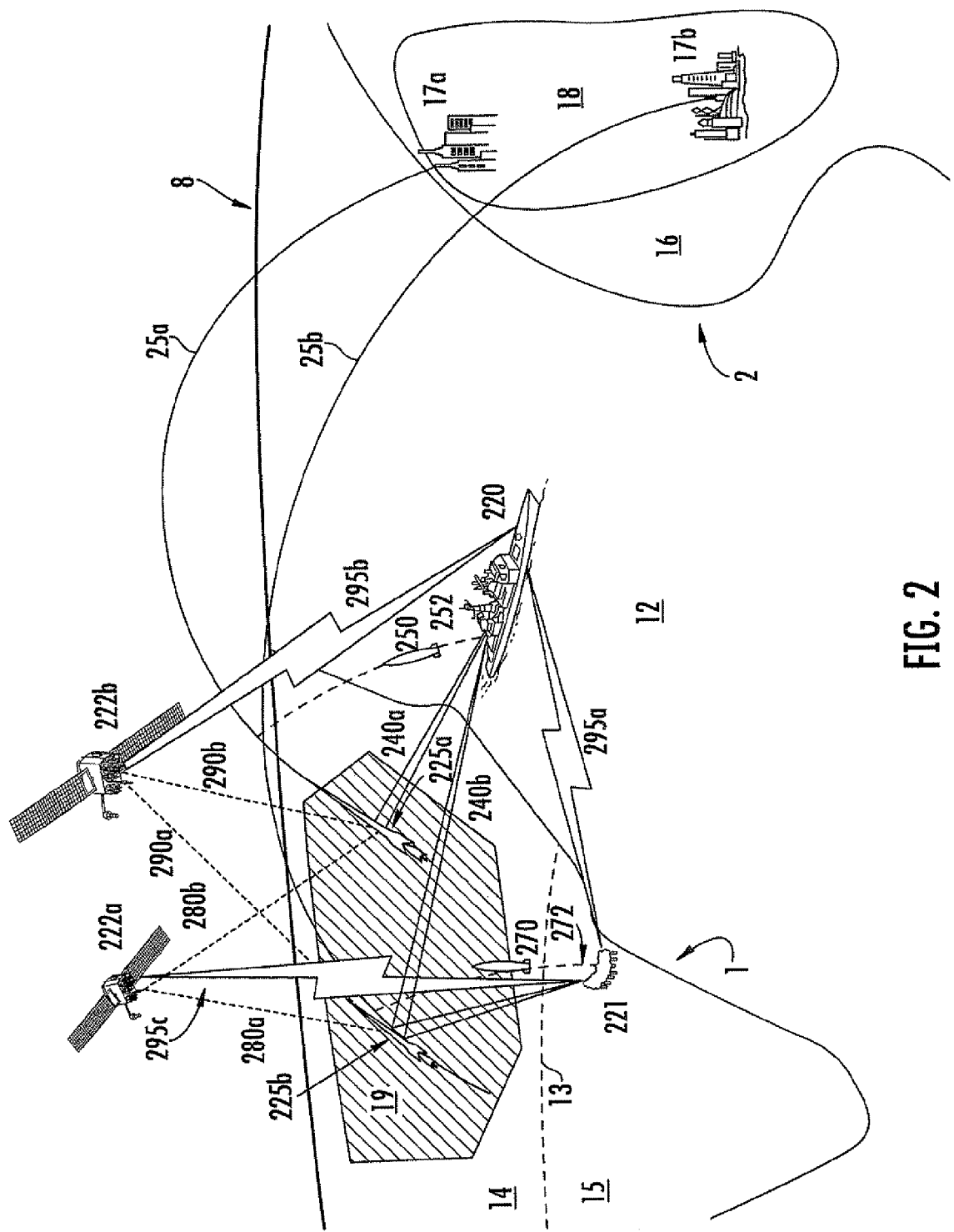
FIG. 2 is a simplified diagram illustrating a scenario similar to that of FIG. 1, showing how defensive assets are used.

FIG. 2 illustrates the same region as FIG. 1, and corresponding elements are designated by like alphanumerics. In this case, three types of defensive assets, namely ship 220, land-based interceptor launcher 221, and spacecraft 222*a* and 222*b*, are participating in an engagement against two threat missiles 225*a* and 225*b* traveling along trajectories 25*a* and 25*b*, respectively. The sea based asset 220 has a sensor arrangement which is capable of "deploying" surveillance volumes 240*a* and 240*b*, and is also capable of launching one or more intercepting missiles 250 along paths, one of which is illustrated as a dash line 252, for attempting to destroy ballistic missile threat 225*a* or 225*b*. Of course, if there are plural threat missiles, plural interceptors are expected to be launched. More than one interceptor may be launched to improve the chances of destroying a particular missile, if desired. The land based asset 221 has a sensor arrangement which is capable of "deploying" a surveillance volume 260, and is also capable of launching an intercepting missile 270 along path 272 for destroying ballistic missile threats. The space based assets have sensor arrangements capable of sensing ballistic missile threats within regions subtended by dotted lines 280*a*, 280*b*, and 290*a*, 290*b*, respectively. The land asset 221, sea asset 220, and space assets 222*a*, 222*b* have the capability of relaying information to each other. The links are illustrated by "lightning bolt" symbols 295*a*, 295*b*, and 295*c*. The links could include any form of real or near-real-time communication between assets. Communication links are shown directly between assets to illustrate that information is conveyed from one asset to another, however communications do not have to be directly between assets but could use intermediary ground, air, or space-based assets.

In operation of the arrangement of FIG. 2, ship asset 220 detects the threat missiles by observing surveillance volumes 240*a* and 204*b*, and tracks the threat missiles 225*a*, 225*b* along at least a portion of their tracks 25*a* and 25*b*. Land-based asset 221 detects the threat missile 225*b* along at least a portion of its track 25*b* by observing surveillance volume 260. The space based assets 222*a* and 222*b* also observe both threat missiles along at least a portion of their tracks 25*a* and 25*b*.

In operation of the arrangement of FIG. 2, the land- and sea-based assets are both capable of launching interceptors against threat missiles. Both of the countermeasure or interceptor-launching assets, namely the land-based asset 221 and the sea-based asset 220, receive track information from all assets participating in the engagement, namely 220, 221, and 222*a*&*b*, via the links illustrated by 295*a*, 295*b*, and 295*c*. Both the sea based asset 220 and the land based asset 221 form or generate a fire control solution for both threat missiles 25*a* and 25*b*. Assets 220 and 221 exchange information about the quality or "goodness" of their respective fire control solutions and determine the best combination of interceptor launches to defeat both threat missiles 225*a* and 225*b*. In this example, the sea-based asset 220 launches an interceptor 250 along a track illustrated as 252 to attempt to destroy the threat missile on trajectory 25*a*, and the land-based asset 221 launches an interceptor 270 along path 272 to destroy the threat missile on trajectory 25*b*. It is irrelevant to the issues whether the communications link, sensors, and interceptors are land, sea, air, or space based.

Figure 3:
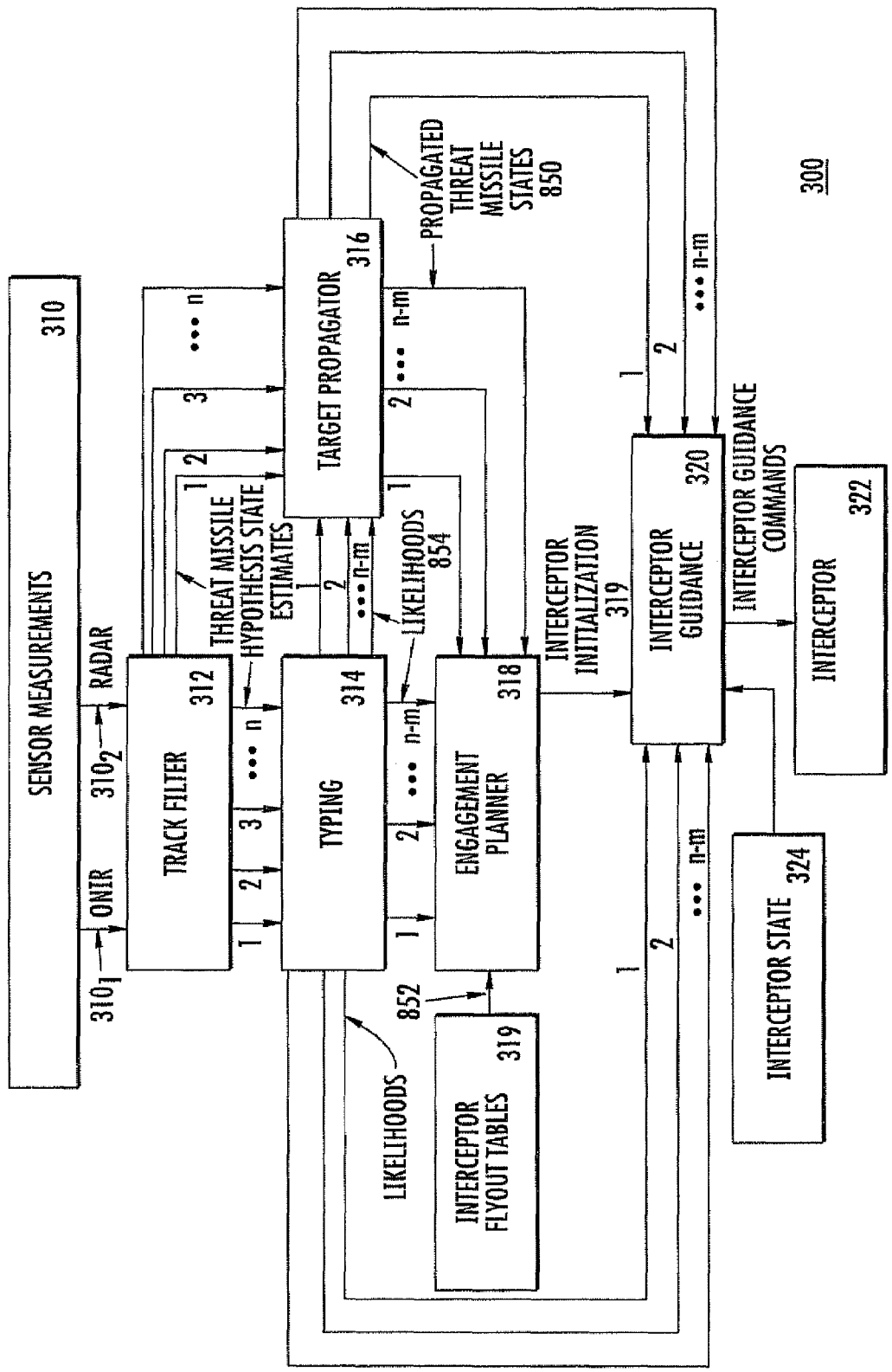
FIG. 3 is a simplified block diagram of a boost phase fire control system architecture.

FIG. 3 is a simplified logic flow diagram or chart illustrating the overall architecture or operation 300 of a boost phase fire control system according to an aspect of the invention. In general, the boost phase fire control system 300 of FIG. 3 considers multiple hypotheses including a set of target hypotheses including n possible threat missile/stage combinations that might be encountered, where n is an integer number greater than zero. For each type of target that might be encountered there are as many hypotheses as the target has stages. That is, the system considers all the threat missile types which might be launched, and all permutations of the trajectory that may be observed. A multi-hypothesis track filter generates state estimates for the n possible threat missile/stage combinations (or hypotheses) based on a priori information about potential threat missiles as well as sensor measurements. In one embodiment, the multiple hypotheses track filter may be such as that described in a U.S. patent application Ser. No. 11/072,902, filed Mar. 4, 2005 in the name of Boka et al., and entitled "Missile Identification and Tracking System and Method," which combines a priori knowledge of the characteristics of various possible types of threat missiles with the track data from the sensors, to establish separate estimates of the target hypotheses' states (position, velocity, and specific mass flow rate) for each stage of each threat hypothesis. This combined information tends to improve the estimate of the target missile states. The track filter state estimates are made available to a typing processor or algorithm. The typing process may include a matched filter scheme as described as part of U.S. Pat. No. 7,026,980, issued Apr. 11, 2006 in the name of Mavroudakis et al. and entitled "Missile Identification and Tracking System and Method", andor any algorithm that uses metrics to determine the likelihood of each hypothesis being correct. These likelihoods should sum to one or unity. The track filter states and the typing likelihoods are made available to a multihypothesis target state propagator. The multihypothesis target state propagator propagates into the future all those threat hypotheses' states whose likelihoods exceed a predetermined or set threshold. It should be emphasized that states are propagated, not likelihoods. Significant computational resources are conserved by not propagating those states associated with hypotheses having low likelihoods. The propagated multihypothesis target states and the typing likelihoods are made available to an engagement planner, which determines the optimal way to engage the threat missile. The engagement planner also receives information about the capability of available interceptors and their location(s) relative to any threat missiles. The engagement planner also ignores hypotheses with likelihoods below a set threshold, for additional computation resource conservation. A selected interceptor is initiated, launched, and guided to the target using a boost phase guidance algorithm. The boost phase guidance algorithm uses the propagated hypothesis positions and likelihoods to estimate the location of the target at intercept. During guidance, a composite track is formed or defined that represents the weighted-average position of the hypothesis. The weighted average is a function of each threat hypothesis' position and its associated likelihood.

The operation of the logic 300 of FIG. 3 begins with the sensing of a boost phase ballistic missile soon after launch. Sensing immediately at launch is not possible with a surface-based sensor because the curvature of the Earth prevents it from observing the actual launch. The delay between launch and first sensing depends upon the acceleration of the missile, the immediate topology around the launch site and the sensing location, and the distance between the launch site and the sensor location, but may be about 25 seconds or more. An Overhead Non-imaging Infrared (ONIR) sensor, on the other hand, can produce results instantaneously or with only a short delay depending on cloud cover at the launch site. The sensor measurements are represented in FIG. 3 by a block 310, which produces ONIR sensor signals at an ONIR output port $310_1$, and/or radar measurements at a RADAR output port $310_2$. The sensor signals, from whatever source, are applied from ports $310_1$ and $310_2$ to a block 312, which represents a multihypothesis track filter. The multihypothesis track filter combines a priori knowledge of the characteristics of various possible types of threat missiles with the track data from the sensors, to establish separate estimates of the target hypotheses' states (at least position and velocity) for n possible hypotheses. A multihypothesis track filter maintains separate filters for each hypothesis and uses a priori information about each hypothesis to improve the state estimates for each hypothesis over (by comparison with) a filter that uses no a priori information. One implementation of a multihypothesis filter is U.S. patent application Ser. No. 11/072,902, filed Mar. 4, 2005 in the name of Boka et al., and entitled "Missile Identification and Tracking System and Method." The separate estimates consisting of n possible threat/stage hypotheses appear at output ports 1, 2, 3, ..., n of the track filter 312, and are made available to a typing processor represented as a block 314 and to a target propagator represented as a block 316. Typing algorithm or block 314 uses multiple metrics to determine the likelihood that each hypothesis is correct. These likelihoods sum to unity or one, and this summing characteristic is later used to generate weighting factors for each threat hypothesis.

The track filter states from track filter block 312 of FIG. 3 and the likelihoods from typing block 314 are applied to a multihypothesis target propagator block 316. Target propagator block 316 propagates into the future all those threat hypotheses having likelihoods above a threshold level. In one version of the target propagator, the threshold level is fixed. As illustrated in FIG. 3, target propagator block 316 produces n-m propagated threat states, where m is the number of hypotheses with likelihoods falling below the threshold. Significant computational resource savings arise from not propagating the low-likelihood threat states. Early in an engagement little track data is available from which the track filter can produce estimated track states, so there is little information on which to base the discarding of hypotheses, so most or all hypotheses are propagated. As more data becomes available from the sensors the typing block 314 is expected to be able to discount certain hypotheses and to assign low probabilities to other hypotheses.

The propagated multihypothesis threat states from target propagator block 316 of FIG. 3 are applied to an engagement planner illustrated as a block 318 together with the likelihood information from typing block 314. Engagement planner 318 also receives interceptor missile flyout data or tables from a block illustrated as 319. Engagement planner 318 uses a subset of the hypotheses to determine an optimal way to engage the target. In order to conserve computational resources, the engagement planner 318 ignores those hypotheses having likelihoods below the threshold. The optimal engagement information is coupled to initialize an interceptor guidance processing illustrated as a block 320.

Interceptor guidance block 320 of FIG. 3 receives optimal engagement information from block 318, propagated threat missile states from 316, likelihood information from block 314, and interceptor state information from a block 324. The interceptor state information contains information describing the state of the interceptor (such as position, velocity, and acceleration) at the time that the interceptor guidance function block 320 is entered from block 324. Interceptor guidance block 320 estimates the location of the target at the time of intercept. Launch and intercept guidance commands are applied from interceptor guidance block 320 to the interceptor 322. The intercept guidance commands are preferably based on a boost phase guidance algorithm which uses the propagated hypothesis positions and likelihoods to estimate the location of the target at intercept. During guidance a composite track is formed or generated that represents a weighted-average position of the hypotheses. The weighted-average position is a function of each threat hypothesis' position and its associated likelihood. During the course of an engagement, the target state and hypothesis likelihoods are updated as more information becomes available. The track filter 312, the target propagator 316, the engagement planner 318, and the interceptor guidance 320 all take advantage of the new data to refine their solutions.

Figure 4A:
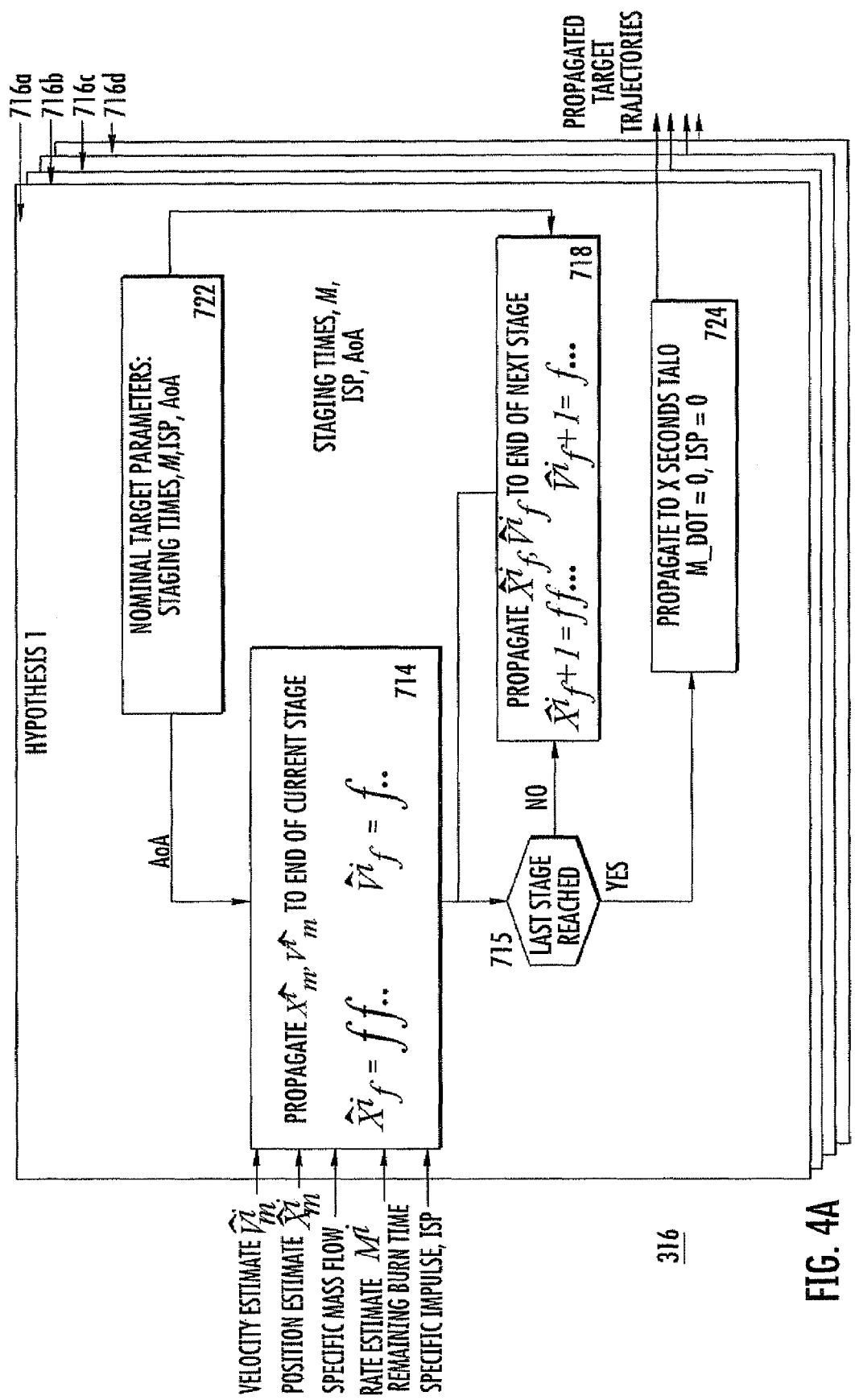
FIGS. 4a and 4b are simplified block diagrams of different boost phase target propagators.

FIG. 4a is a simplified diagram of a possible embodiment of boost phase target propagator 316, which uses physics based propagation of multiple target hypotheses to predict the future flight path of a target. In FIG. 4a, target propagator 316 includes a plurality of separate trajectory prediction algorithms, one for each hypothesis. The separate trajectory algorithms are designated 716a, 716b, 716c, and 716d. Those skilled in the art know that more or fewer such algorithms may be used, depending upon the number of hypotheses expected to exceed the threshold. In FIG. 4a, all the algorithms 716a, 716b, 716c, and 716d are identical, so only algorithm 716a is described. Algorithm 716a of FIG. 4a receives target hypothesis state estimates from track filter 312 of FIG. 3 in the form of remaining burn time for the current stage, velocity estimates $\hat{V}_m^i$, position estimates $\hat{X}_m^i$, specific mass flow rate $\dot{M}$, and specific impulse for the current stage.

Block 722 of FIG. 4a represents a memory which stores predetermined nominal target parameters derived from analytic or observational evaluation (or both) of the various threat missiles which might be encountered. These nominal target parameters may include staging times, specific mass flow rate (M-dot or $\dot{M}$, the rate of change of the mass of the missile divided by the mass of the missile), specific thrust or ISP, and angle of attack (AoA) or angular difference between the longitudinal axis of the missile and the airflow around it.

Block 722 in FIG. 4a provides the propagation stage 714 with the nominal values of angle of attack for the target hypothesis/stage combination. Block 714 also receives the estimated velocity $\hat{V}_m^i$, estimated position $\hat{X}_m^i$, $\dot{M}$ estimate, specific impulse (ISP) estimate, and remaining burn time estimate for the current stage from the track filter in block 312 in FIG. 3. The propagation stage 714 propagates the target hypothesis/stage combination to a time corresponding to the estimated end time of the current stage. While propagating the hypothesis to the end of the current stage, the propagated target state (position, velocity, and acceleration) is saved at points sufficiently close in time (such as one second apart) to completely represent the target trajectory for the engagement planner block 318 and the interceptor guidance block 320. These saved states are the eventual output of the propagator 716a.

The assumption is made in the calculations of block 714 that the target acceleration obeys the standard rocket equation $$\ddot{x} = \frac{I_{sp} g_c \dot{m}}{m} \quad (1)$$

where:
 $\ddot{x}$ is acceleration;
 $I_{sp}$ is specific impulse;
 $g_c$ is the force of gravity;
 $\dot{m}$ is the mass flow rate; and
 m is the target mass.

Additionally, in order to derive the filter dynamics equations, it is assumed that the target's specific impulse $I_{sp}$ is constant. Also, due to the high altitudes at which the propagation takes place, the algorithms of block 714 assume that the rocket pressure correction (pressure thrust) and atmospheric drag are negligible. Given these assumptions, the following equations (2), (3), (4) and (5) describe the assumed boost phase target propagator (BPTP) target kinematics:

$$\ddot{\underline{Z}}(t) = \underbrace{\frac{-\mu \underline{Z}(t)}{|\underline{Z}(t)|^3}}_{[\text{gravity}]} + \underbrace{\underline{A}(t)}_{[\text{thrust}]} \underbrace{- \omega \times (\omega \times \underline{Z}(t))}_{[\text{centrifugal}]} \underbrace{- 2\omega \times \underline{\dot{Z}}(t)}_{[\text{coriolis}]} \quad (2)$$

$$\underline{A}(t) = I_{sp} g_c \underline{b}(t)$$

$$A(t) = |\underline{A}(t)|$$

$$\dot{\underline{b}}(t) = |\underline{b}(t)| \cdot \underline{b}(t)$$

where
 $\ddot{\underline{Z}}(t)$ is the target acceleration vector (Earth-fixed reference frame);
 $\dot{\underline{Z}}(t)$ is the target velocity vector (Earth-fixed reference frame);
 $\underline{Z}(t)$ is the target position vector (Earth-fixed reference frame);

$\mu$ is the Earth gravitational constant;
 $\underline{\omega}$ is the Earth angular velocity vector;
 $I_{sp}$ is the specific impulse of the target rocket motor;
 $g_c$ is the standard gravitational acceleration at Earth's equator; and
 $\underline{b}(t)$ is the specific mass flow vector of target rocket motor, all as described in more detail in U.S. Pat. No. 7,181,323, issued Feb. 20, 2007 in the name of Boka et al. and entitled Computerized Method for Generating Low-Bias Estimates of Position of a Vehicle From Sensor Data. This patent describes a boost filter, the Unified Unbiased Rocket Equation Extended Kalman Algorithm (UUREEKA), which estimates current states.

The Boost Phase Target Propagator (BPTP) state vector determined in block 714 of FIG. 4a with the aid of equations (1) and (2) is $$\underline{s}(t) = \begin{Bmatrix} \underline{Z}(t) \\ \underline{\dot{Z}}(t) \\ \underline{b}(t) \\ A(t) \end{Bmatrix} \quad (3)$$

The derivative of the state vector is $$\underline{\dot{s}}(t) = \begin{Bmatrix} \underline{\dot{Z}}(t) \\ \underline{\ddot{Z}}(t) \\ \underline{\dot{b}}(t) \\ \dot{A}(t) \end{Bmatrix} = \begin{Bmatrix} \underline{\dot{Z}}(t) \\ \frac{-\mu \underline{Z}(t)}{|\underline{Z}(t)|^3} + \frac{A(t)\underline{b}(t)}{|\underline{b}(t)|} - \omega x(\underline{Z}(t)) - 2\omega x \underline{\dot{Z}}(t) \\ |\underline{b}(t)|\underline{b}(t) \\ A(t)|\underline{b}(t)| \end{Bmatrix} \quad (4)$$

Time propagation of the BPTP state vector is performed by numerically integrating the state derivative vector equation (4):

$$\underline{s}(t + \Delta t) = \underline{s}(t) + \int_t^{t+\Delta t} \underline{\dot{s}}(\underline{s}(t)) dt \quad (5)$$

Any appropriate numerical integration technique, such as a fourth-order Runge-Kutta, can be used. Propagator 714 of FIG. 4a propagates into the future the current states received from the boost filter.

Decision block 715 of FIG. 4a follows block 714 and uses knowledge of how many stages a threat hypothesis has to determine if the final stage for that hypothesis has been reached in the computations. If the final stage of the hypothesis has not been reached, the logic leaves decision block 715 by the NO output and flows to a further propagation block 718. Block 718 performs the integration or propagation of the target state from the time of burnout of the current stage to the end of burn of the next stage, with equations corresponding to equations (2), (3), (4), and (5) above, together with knowledge of nominal values for the staging time(s), specific mass flow rate, ISP, and angle of attack for the stage of the particular hypothesis under consideration as provided by block 722. Upon completion of the propagation in block 718 to the end of the stage, decision block 715 is accessed again. If the final stage for the hypothesis has not been reached, then propagation in block 718 is executed again, and the loop over blocks 718 and 715 is repeated until the final stage computation is completed. If the final stage for the hypothesis has been reached, the logic leaves decision block 715 by the YES output, and flows to a block 724. Block 724 propagates the hypothesis/stage combination ballistically with equations corresponding to equations (2), (3), (4), and (5) above, but with the specific mass flow rate and specific impulse set to zero. The zero value of specific mass flow rate and specific impulse correspond to a threat missile operating in a ballistic mode, rather than boosting. The calculations continue in block 724 until a selected time after lift off (TALO) is reached in the calculations, which time is chosen so that no intercepts can thereafter occur, and thus the engagement planner (318 of FIG. 3) and interceptor guidance (320 of FIG. 3) cannot need the information. While propagating the hypothesis through burnout of the last stage and ballistically thereafter, the propagated state (position, velocity, and acceleration) is saved at points sufficiently close in time (such as one second apart) to completely represent the target trajectory for the engagement planner block 318 and the interceptor guidance block 320.

The output of block 724 of page 716a of FIG. 4a represents a propagated target trajectory for one target hypothesis/stage combination, and the cumulation of the outputs of all the corresponding blocks of trajectory prediction pages 716a, 716b, 716c, ... and 716d represent the trajectories of all the n-m hypotheses. These propagated target hypotheses each include position, velocity, and acceleration time histories from the current time to a specified future time.

The boost phase target missile propagator 316 of FIG. 4a uses physics-based propagation of multiple hypotheses to predict the future behavior of the target, using a limited set of a priori knowledge about the target hypothesis together with the rocket equation. The technique is superior to the use of target templates for each hypothesis because of the very large number of templates which must be used to not only represent the nominal trajectories of the various hypotheses, but all the possible variations of each trajectory such as lofting or depressing the trajectory, hot and cold engine burns, and the like which are necessary to span the entire trajectory space.

Figure 4B:
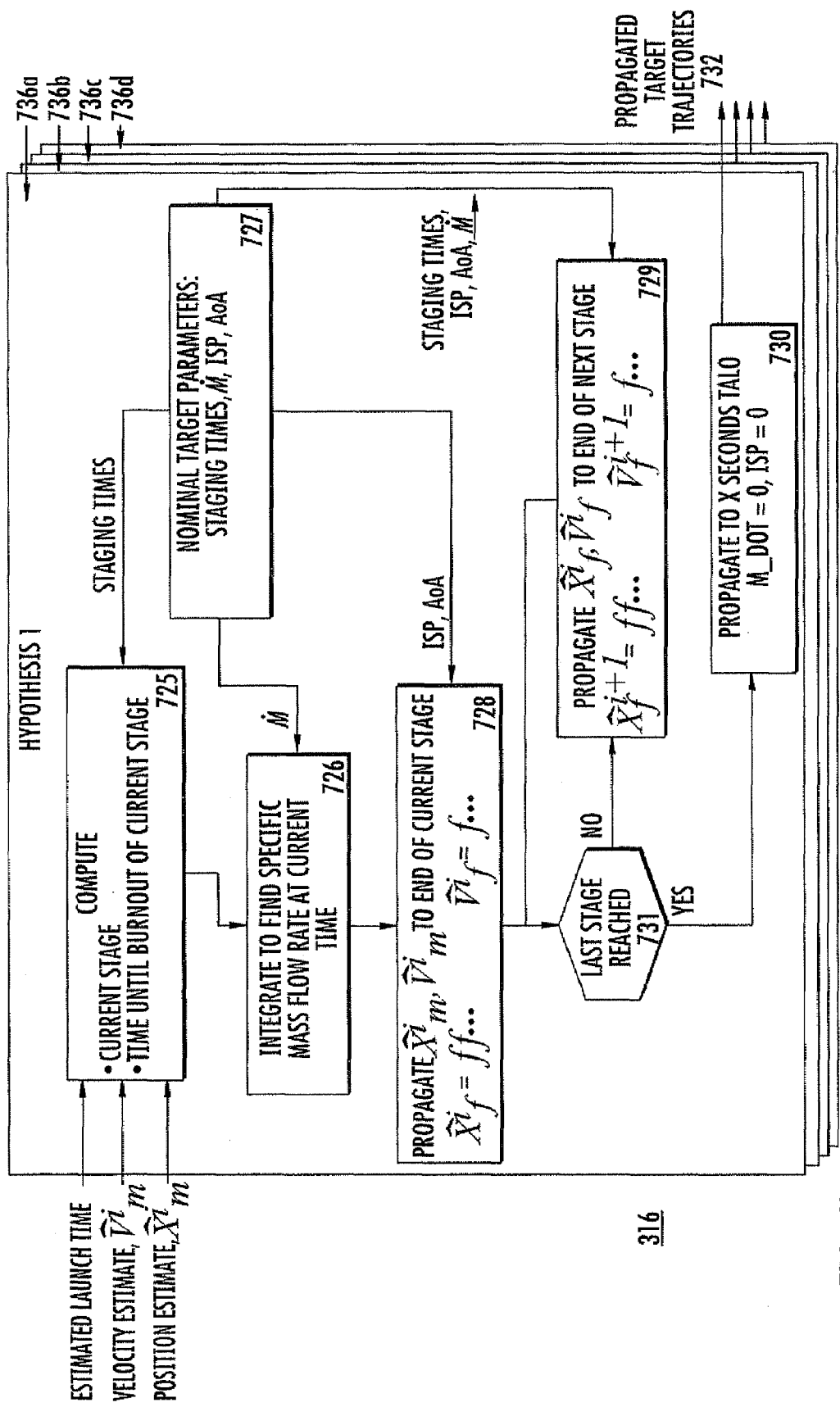

The boost phase target propagator of FIG. 4a utilizes outputs of a track filter described in the abovementioned patent application Ser. No. 10/972,943 filed on Oct. 25, 2004 in the name of Boka et al. A more general type of boost phase target propagator which can be used with a track filter that produces only estimates of threat missile position, threat missile velocity, and time since launch of a threat missile is described in conjunction with FIG. 4b. In the embodiment of FIG. 4b, the target propagator 316 relies on less information from the track filter and more on a priori information than in the arrangement of FIG. 4a.

FIG. 4b is a simplified diagram of a boost phase target propagator 316, which uses physics based propagation of multiple target hypotheses to predict the future flight path of a target. In FIG. 4b, target propagator 316 includes a plurality of separate trajectory prediction algorithms, one for each target hypothesis. The separate trajectory algorithms are designated 736a, 736b, 736c, and 736d. Those skilled in the art know that more or fewer such algorithms may be used, depending upon the number of target/stage hypotheses expected to exceed the threshold. In FIG. 4b, all the algorithms 736a, 736b, 736c, and 736d are identical, so only algorithm 736a is described. Algorithm 736a of FIG. 4b receives target hypothesis state estimates from track filter 312 of FIG. 3 in the form of a launch time estimate, velocity estimate $\hat{V}_m^i$, and position estimate $\hat{X}_m^i$ for each target/stage hypothesis. Block 727 of FIG. 4b represents a memory which stores predetermined nominal target parameters derived from analytic or observational evaluation (or both) of the various threat missiles which might be encountered. These nominal target parameters may include staging times, specific mass flow rate (M-dot or $\dot{M}$, the rate of change of the mass of the missile divided by the mass of the missile), specific thrust or ISP, and angle of attack (AoA) or angular difference between the longitudinal axis of the missile and the airflow around it.

Block 727 in FIG. 4b may be viewed as being a memory that provides nominal staging times for all target hypotheses to the stage/burn time computation of block 725. The current stage and time until burnout of the current stage are computed in stage/burn time computation block 725. The current stage for each hypothesis is computed in block 725 by subtracting the current time from the estimated launch time supplied by track filter 312 of FIG. 3, and comparing the resulting estimate of time since target launch to the nominal target timeline for each hypothesis supplied by block 727. The time that has elapsed since target launch indicates which stage the hypothesis is in.

Integrator block 726 in FIG. 4b receives the staging estimate from block 725 and the nominal specific mass flow rate $\dot{M}$ at the start of the current stage from memory block 727, and determines the specific mass flow rate $\dot{M}$ at the current time for the target/stage combination (or hypothesis) in question, and supplies the specific mass flow rate information to a block 728, which represents propagation of the position, velocity, and acceleration information to the end of the current stage. Propagation block 728 also receives specific impulse (ISP) and Angle of Attack (AoA) information for the same hypothesis from memory block 727. The stage propagation block 728 propagates the hypothesis to a time corresponding to the estimated end time of the current stage. While propagating the hypothesis to the end of the current stage, the propagated target state (position, velocity, and acceleration) is saved at points sufficiently close in time (such as one second apart) to completely represent the target trajectory for the engagement planner block 318 and the interceptor guidance block 320. These saved states are the eventual output of the propagator 736a. The propagation process followed by block 728 is the same as that described in equations (2), (3), (4), and (5) above. Propagator block 728 of FIG. 4b propagates to the end of the current stage the current states received from the boost filter.

Decision block 731 of FIG. 4b follows block 728 and uses knowledge of how many stages a threat hypothesis has to determine if the final stage for that hypothesis has been reached in the computations. If the final stage of the hypothesis has not been reached, the logic leaves decision block 731 by the No output and flows to a further propagation block 729. Block 729 performs the integration or propagation of the target state from the time of burnout of the current stage to the end of burn of the next stage, with equations corresponding to equations (2), (3), (4), and (5) above, together with knowledge of nominal values for the staging time(s), specific mass flow rate, ISP, and angle of attack for the stage of the particular hypothesis under consideration as provided by block 727. Upon completion of the propagation in block 729 to the end of the stage, decision block 731 is accessed again. If the final stage for the hypothesis has not been completed, then propagation in block 729 is executed again, and the loop over blocks 729 and 731 is repeated until the final stage computation is completed. If the final stage for the hypothesis has been completed, the logic leaves decision block 731 by the Yes output, and flows to a block 730. Block 730 represents the propagation of the hypothesis/stage combination ballistically with (or using) equations corresponding to equations (2), (3), (4), and (5) above, but with the specific mass flow rate and specific impulse set to zero. The zero value of specific mass flow rate and specific impulse correspond to a threat missile operating in a ballistic mode, rather than actively boosting. The calculations continue in block 730 until a selected Time After Lift Off (TALO) is reached in the calculations, which time is chosen so that no intercepts can thereafter occur, and thus the engagement planner (318 of FIG. 3) and interceptor guidance (320 of FIG. 3) cannot need the information. While propagating the hypothesis through burnout of the last stage and ballistically thereafter, the propagated state (position, velocity, and acceleration) is saved at points sufficiently close in time (such as one second apart) to completely represent the target trajectory for the engagement planner block 318 and the interceptor guidance block 320.

The output of block 730 of page 736a of FIG. 4b represents a propagated target trajectory for one target/stage combination (or hypothesis), and the cumulation of the outputs of all the corresponding blocks of trajectory prediction pages 736a, 736b, 736c, . . . and 736d represent the trajectories of all the n-m hypotheses. These propagated target hypotheses each include position, velocity, and acceleration time histories from the current time to a specified future time.

The boost phase target missile propagator 316 of FIG. 4b uses physics-based propagation of multiple hypotheses to predict the future behavior of the target, using a limited set of a priori knowledge about the target hypothesis-together with the rocket equation. The technique is superior to the use of target templates for each hypothesis because of the very large number of templates which must be used to not only represent the nominal trajectories of the various hypotheses, but all the possible variations of each trajectory such as lofting or depressing the trajectory, hot and cold engine burns, and the like which are necessary to span the entire trajectory space.

Figure 5:
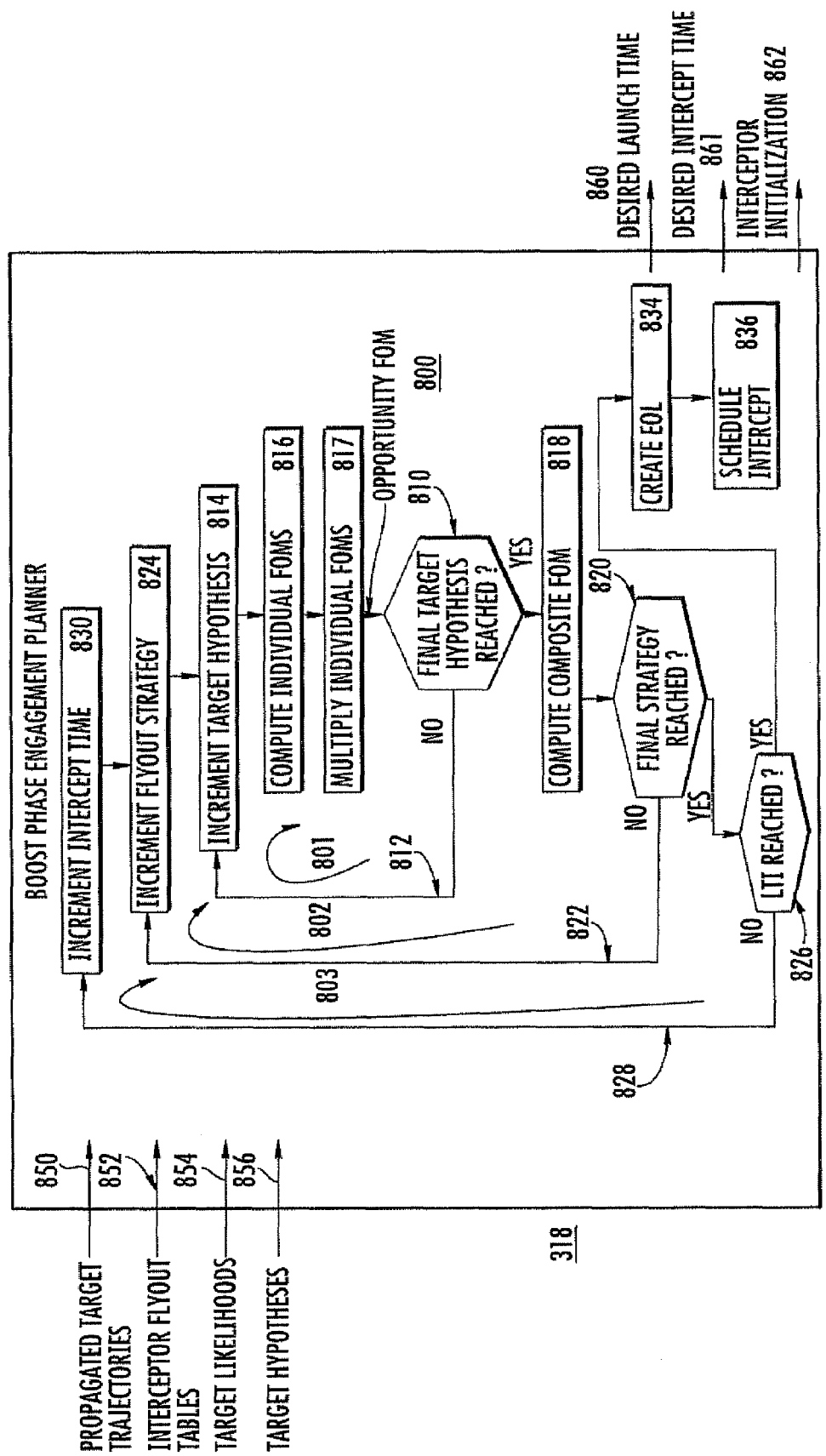
FIG. 5 is a simplified logic flow or diagram of a boost phase engagement planning portion of the logic of FIG. 3.
Figure 6:
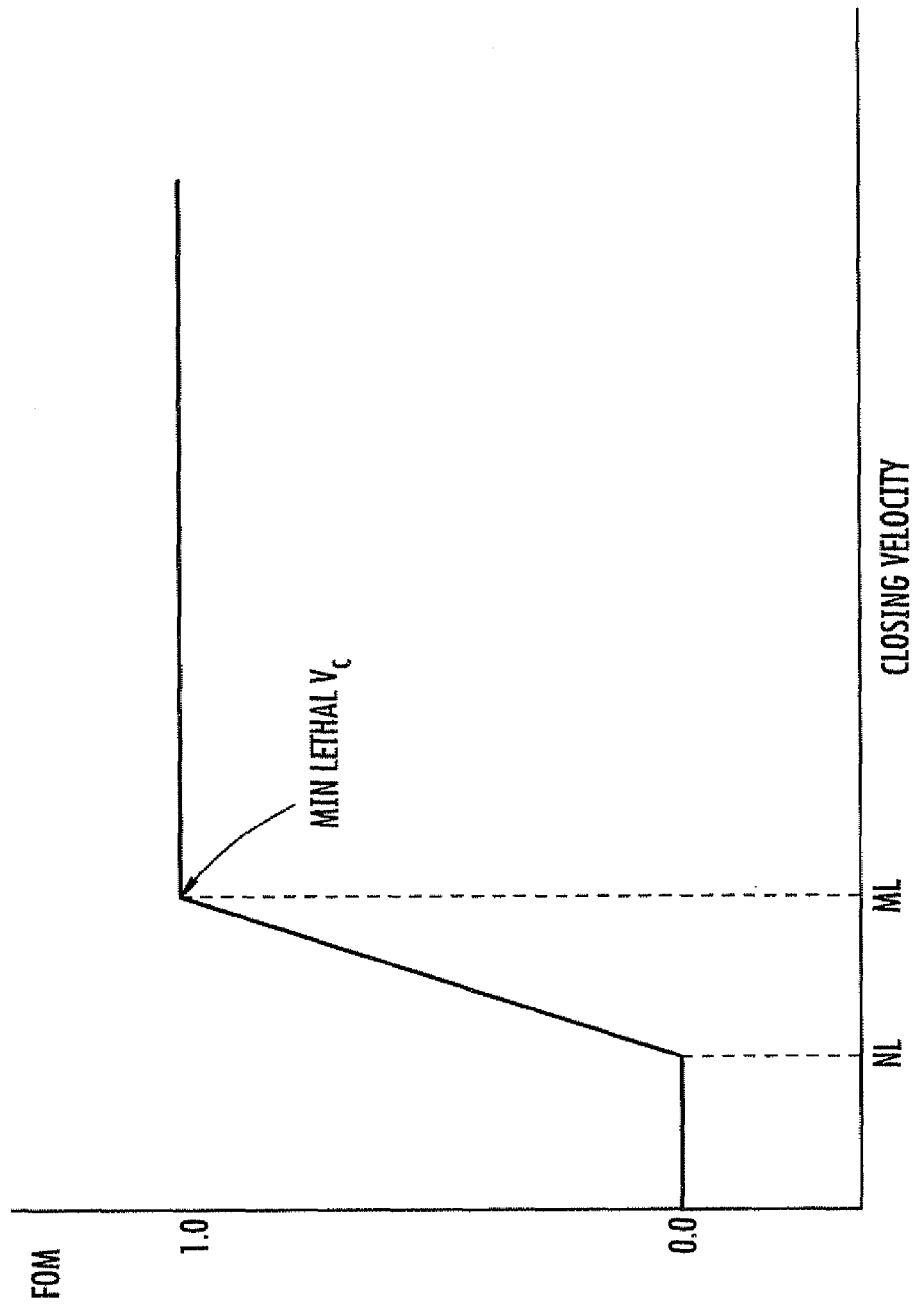
FIG. 6 plots a Figure of Merit against kill vehicle closing speed.

FIG. 5 is a simplified logic flow chart or diagram illustrating one form 800 which the logic of a boost phase engagement planner can take according to an aspect of the invention. The logic 800 of FIG. 5 receives propagated target states or trajectories 850 from a target propagator and target likelihoods 854 from a typing algorithm, such as 316 and 314, respectively, of FIG. 3. Logic 800 also receives a priori generated interceptor flyout tables 852 that capture crucial interceptor performance characteristics for the interceptors' battle space, such as 319 of FIG. 3, and produces information relating to the desired launch time 860, desired intercept time 861, and interceptor initialization information 862. The logic 800 of FIG. 5 may be understood by considering that, after initialization of the logic, an inner loop 801 including a decision block 810 determines if a final target hypothesis has been reached. If not, the logic leaves decision block 810 by the NO output, and proceeds by way of a logic path 812 to a block 814, which represents the incrementing of the target hypothesis to the next hypothesis. From block 814, the logic flows to a block 816, which represents the computation of individual Figures of Merit (FoM) for the current combination of intercept time, interceptor flyout policy, and target hypothesis. Individual FoMs may be of any type which are related to the success of the intercept, and may include, for example, interceptor constraints such as maximum time of flight or time required for a Kill Vehicle to activate and divert to a threat missile. Other relevant metrics, relating to lethality of a hit-to-kill intercept, include closing velocity and approach angle. Metrics relating to the target itself include target burnout time and target staging times. A metric relating to the fire-control system performance is the predicted target track errors. An individual FoM factor is computed in block 816 for each metric considered; each such FoM factor takes on a value ranging from zero to unity (0 to 1). Consider, as an example of generating an individual FoM factor, the closing velocity FoM. FIG. 6 illustrates a curve which relates FoM to closing velocity. In FIG. 6, closing velocities to the right of a velocity ML are deemed to be lethal, with the closing velocity represented by ML representing the minimum velocity considered to be lethal. Any closing velocity above ML is deemed to have a FoM of 1.0. Closing velocities below a never-lethal value of NL are given a FoM of 0.0. In the range between NL and ML, the FoM changes more-or-less linearly between 0.0 and 1.0. Other FoM factors are constructed in similar ways, and each represents a property more or less vital to the success of the engagement. Thus, any intercept solution under consideration will be associated with a plurality of individual Figures-of-Merit (FoMs), each in the range of 0.0 to 1.0. The individual FoMs are multiplied together in a block 817 of FIG. 5 to determine the "opportunity FoM" for each intercept time, interceptor flyout strategy, and target hypothesis combination. The "interceptor flyout strategy" refers to the mode of flying or operating an interceptor; this could be, for example, a particular energy management policy (Interceptor flyout strategies for multiple interceptor types may also be supported; all methods of flying all interceptors are collectively known as interceptor flyout strategies). Opportunity FoMs use a simple set of metrics to assign a numerical value representing the quality or "goodness" of each potential intercept solution. In this context, "quality" and "goodness" are used as synonyms. The metrics, and the values that these metrics take on, are specified a priori. The opportunity FoM produced by block 817, being the multiplicative product of values lying between 0 and 1, will therefore have a value lying between 0.0 and 1.0. The logic continues to flow around the loop including decision block 810, path 812, and blocks 814, 816, and 817 until such time as a final target hypothesis is reached. The final target hypothesis is the last hypothesis in a list of possible hypotheses, and is identified, for example, when the running index for inner loop 801 reaches its maximum (or minimum) value.

When a final target hypothesis is reached, decision block 810 of FIG. 5 routes the logic flow to a block 818, which represents the computation of a composite FoM. Composite FoM block 818 combines the opportunity FoMs into a single FoM value for each intercept time and interceptor strategy combination. The composite FoM is computed by $$FoM_{COMP} = \sum_{i=1}^{n} FoM_i LH_i \qquad (6)$$

where:

$FoM_{COMP}$ is the composite FoM;

FoM is the opportunity FoM for each combination of intercept time, interceptor flyout strategy, and target hypothesis;

LH is the likelihood of a target hypothesis being correct; and n is the number of target hypotheses to consider. The likelihood LH is received from a typing algorithm, such as typing block 314 of FIG. 3. The composite FoM represents the quality or goodness of attempting the intercept of the threat at the given intercept time with the given interceptor flyout policy. Weighting the FoMs by the likelihoods balances the need to intercept with a high FoM and to shoot at the correct target hypothesis. It is similarly bad to have an intercept solution with a bad FoM as it is to shoot a target hypothesis with low likelihood of being the correct target. The composite FoM is computed for each pairing of intercept time and interceptor flyout strategy.

When the composite FoM is calculated in block 818 of FIG. 5, the logic 800 flows to a further decision block 820, which determines if the final interceptor flyout strategy has been reached. The final strategy is the last of a finite number of strategies considered, as indicated, for example, by the reaching of an extreme value of a running index counting iterations around a middle loop 802. If a final strategy has not been reached, the logic leaves decision block 820 by the NO output, and flows by way of a logic path 822 to a block 824. Block 824 increments the interceptor flyout strategy, block 814 restarts the incrementing of the target hypotheses, and the logic continues to flow around the inner loop 801 including blocks 810, 814, 816, and 817. The logic proceeds around the inner loop until a final target hypothesis is again reached, and then loops around the middle loop including blocks 818 and 820, path 822, block 824, and the inner loop 801 until a final strategy is again reached. Eventually, the iterating logic will reach a final strategy, and decision block 820 will route the logic by its YES output to a further decision block 826. Decision block 826 determines if the Latest Time to Intercept (LTI) has been reached. The latest time to intercept is the time corresponding to the last possible opportunity for an interceptor with given kinematic and other constraints to intercept a particular threat missile trajectory. For example, LTI may occur at the maximum range of the interceptor if the threat is flying away from the interceptor launching asset or the threat missile may be descending to an altitude below which a particular interceptor cannot intercept a threat missile. If Latest Time to Intercept (LTI) has not been reached, decision block 826 routes the logic by way of a path 828 of an outer loop 803 to a block 830, which represents an incrementing of the intercept time. The logic flows from block 830 to block 824, which restarts the incrementing of the interceptor flyout strategy. The logic 800 of FIG. 5 continues iterating around the inner, middle and outer loops 801, 802, and 803, respectively. Eventually, decision block 826 will find that LTI has been reached, the logic then leaves block 826 by the YES output and flows to a block 834, which represents the creation of an Engagement Opportunity List (EOL), including the FoMs for all intercept time and interceptor flyout strategy combinations. From block 834, the logic flows to a further block 836. Block 836 represents scheduling of the intercept. Scheduling of the intercept can be done within one asset or through communication among multiple assets. The information produced by logic 800 of FIG. 5 includes the desired interceptor launch time, the desired intercept time, and any other information, such as initialization information, which the specific interceptor andor weapon system may require.

In the logic of FIG. 5, the inner loop 801 runs or iterates the solutions over all allowable target hypotheses, middle loop 802 iterates the solutions over all allowable flyout strategies, and outer loop 803 iterates the solutions over all intercept times. That is, for a given intercept time and flyout strategy, the innermost loop 801 evaluates all target hypotheses within the allowable set. There is no information available relating to unknown target types, so they are necessarily excluded from the allowable set. Similarly, there is a finite set of possible interceptors, which necessarily excludes unknown interceptors and interceptors which exist, but which are not present in the battle space. Intercept times considered are constrained by interceptor kinematics, which is to say that points along a threat missile's trajectory, which cannot be reached by an interceptor, are not considered.

Figure 7:
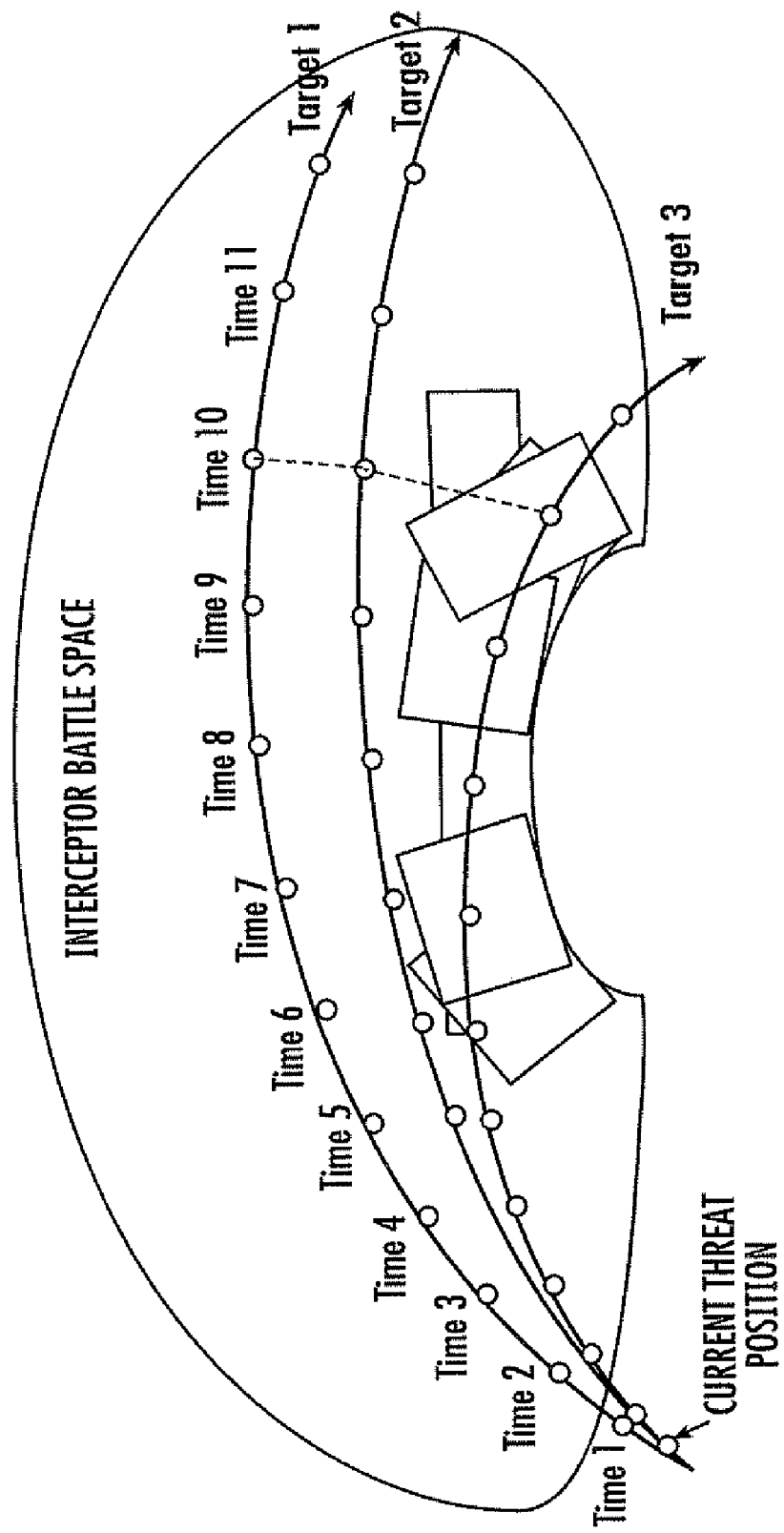
FIG. 7 represents an interceptor battle space useful in understanding the logic of FIG. 5.

FIG. 7 represents an interceptor battle space, including three target hypotheses, designated "Target 1," "Target 2," and "Target 3." The current threat position is indicated, as well as sets of intercept times which the logic 800 of FIG. 5 evaluates. These threat times are designated Time 1, Time 2, Time 3, Time 4, Time 5, Time 6, Time 7, Time 8, Time 9, Time 10, and Time 11. Corresponding times 10 are connected by a dashed line. The inner loop 801 of FIG. 5 produces a weighted FoM for each intercept time. After the value of each composite FoM is computed, it is assigned to a specific location in space. The location is the weighted average position of all the target hypotheses at the intercept time, where the weighting factor is the likelihood that the hypothesis is correct. After all the intercept times are considered, the list of potential solutions is compiled, and sorted such that the solutions with the highest FoM are preferred. One or more of these solutions can be used to launch an interceptor.

FIG. 8 is an example of an Engagement Opportunity List (EOL). The designations in Row 1 describe the contents of each column. Row 2, Row 3, Row 4, Row 5, Row 6, Row 7, Row 8, Row 9 and Row 10 all contain data for hypothetical intercept opportunities. Row 11 illustrates or suggests the idea that more than 10 possible engagements may be listed. The designated columns in the table are representative of types of data that may be found in an EOL. Column 1 contains the ranks of each sample engagement. In this case the engagement with the highest composite Figure of Merit 1100 is listed first. Column 2 contains the composite Figure of Merit values for the sample engagements. Column 3 contains the intercept time values for the sample engagements. Column 4 illustrates the idea that there may be more data than is explicitly called out in Columns 1, 2, 3, and 5 in an EOL. Column 5 contains the launch time values for the sample engagements.

Figure 9:
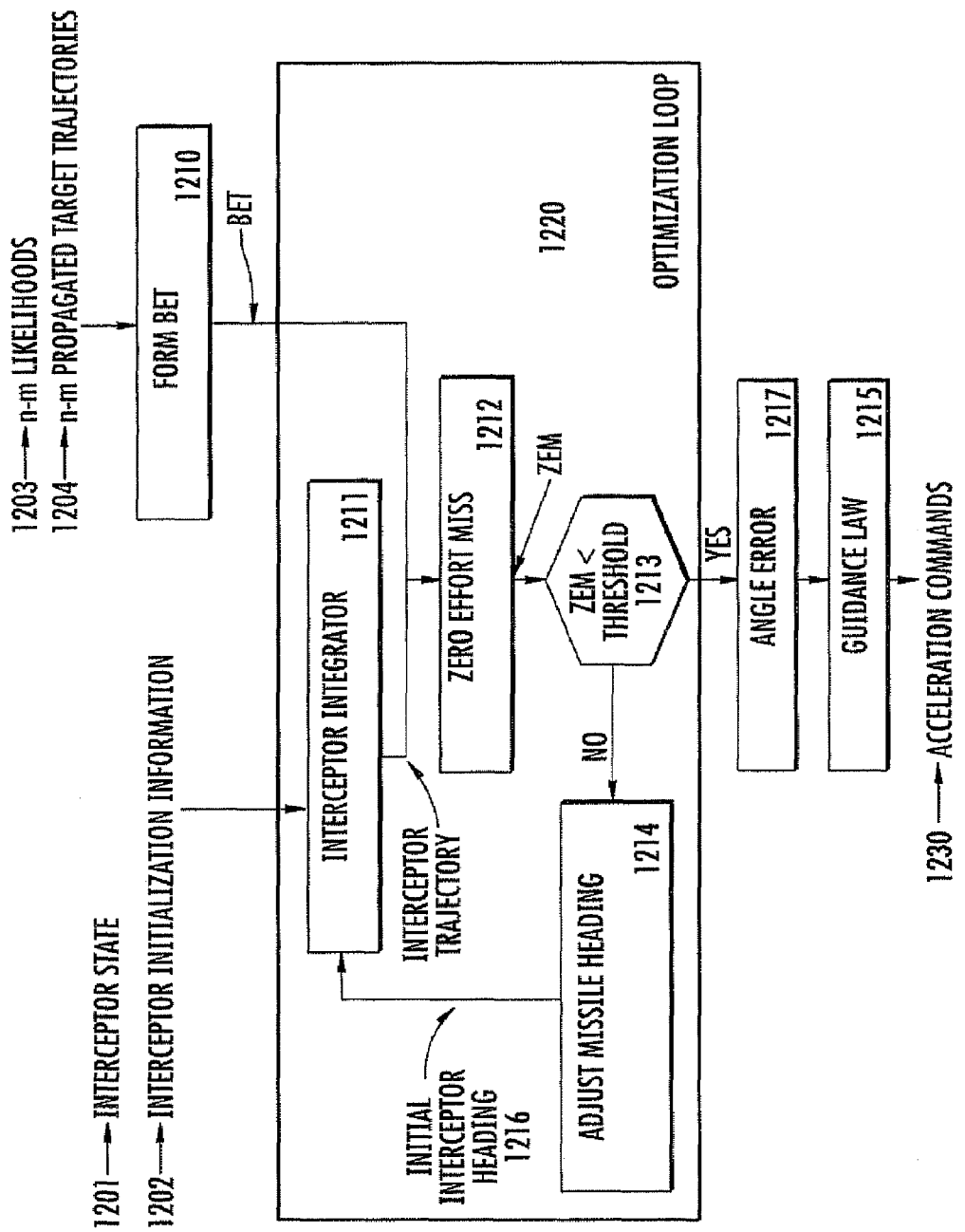
FIG. 9 is a simplified logic flow diagram or chart illustrating the operation of boost phase interceptor guidance.

FIG. 9 is a simplified flow chart or diagram illustrating the operation of boost phase interceptor guidance block 320 of FIG. 3. Boost phase interceptor guidance block 320 receives interceptor initialization information from engagement planner block 318, propagated threat missile states for n-m hypotheses from target propagator 316, and typing information for the n-m hypotheses from typing block 314. In general, the boost phase guidance block 320 computes acceleration commands for the interceptor throughout the interceptor's flight so as to put the interceptor on a collision course with the target missile. These commands depend upon the current heading of the interceptor and of the heading required to intercept the target missile. The commands are generated by integrating the interceptor states forward in time to determine the point of closest approach with a Best Estimated Trajectory (BET) for the threat missile. The integration of the interceptor states forward in time is accomplished with an interceptor model of the appropriate fidelity. An interceptor model may take the form of a fourth order Runge-Kutta integrator with the appropriate time dependent state derivate defined. Those skilled in the art familiar with such an interceptor model. The closest approach is defined as the location in space at which the interceptor and BET are as close to one another as they will come, and those skilled in the art will understand how to compute a point of closest approach. A BET is constructed by weighting the three-dimensional position, velocity, and acceleration states of the n-m hypothesis by the n-m likelihoods as in equations 8, 9, and 10:

$$\overline{X}_{BET} = \sum_{i=1}^{n-m} \overline{X}_i LH_i \qquad (8)$$

$$\overline{V}_{BET} = \sum_{i=1}^{n-m} \overline{V}_i LH_i \qquad (9)$$

-continued $$\overline{A}_{BET} = \sum_{i=1}^{n-m} \overline{A}_i LH_i \qquad (10)$$

where
$\overline{X}$ is a propagated threat missile position for one hypothesis;
$\overline{V}$ is a propagated threat missile velocity for one hypothesis;
$\overline{A}$ is a propagated threat missile acceleration for one hypothesis;
$\overline{X}_{BET}$ is the best estimated threat missile position;
$\overline{V}BET$ is the best estimated threat missile velocity; and
$\overline{A}_{BET}$ is the best estimated threat missile acceleration. Integrating the interceptor states has the advantage of reducing approximation of the interceptor flyout. The heading error is determined by finding an initial (optimal) heading that results in a near zero miss distance (the distance between the interceptor and threat missile BET at the point of closest approach). The computations determine the optimal heading and heading error each time the algorithm is called. The heading error is the difference between the current interceptor heading and the interceptor heading which would result in intercepting the target without further guidance commands. The boost phase interceptor guidance arrangement of FIG. 9 uses an optimization strategy to find the optimal heading. Once the heading error is determined, it is applied to the interceptor guidance law to determine the appropriate acceleration commands. Any appropriate guidance law may be used; one example of a well known guidance law is given in equation 11. The acceleration command magnitude computed in equation 11 is applied perpendicular to the current missile velocity in the direction of the optimal heading.

$$\|Acc\| = \kappa \left( \frac{\|V_{MSL}\| \sin(\lambda)}{T_{go}} \right) \qquad (11)$$

Where:
κ=Constant=3.0
$V_{MSL}$=Missile velocity
λ=Heading error
$T_{go}$=Time to go till end of control
Acc=Magnitude of acceleration command In FIG. 9 the interceptor state 1201 and the interceptor initialization information 1202 are input to the interceptor integrator, represented by a block 1211. The interceptor initialization information 1202 includes information determined by the engagement planner, block 318 of FIG. 3, such as where the location and time of the planned intercept and the launch bearing of the interceptor. The interceptor initialization information can be used to define the initial heading of the missile shortly after it is launched using two angles. The input interceptor state 1201, which is equivalent to the output of block 324 of FIG. 3, contains information describing the state of the interceptor such as position, velocity, and acceleration at the time that the interceptor guidance function, block 320 in FIG. 3, is entered. The interceptor state can be determined using instruments onboard the interceptor (such as GPS andor an inertial measurement unit) or, if the guidance commands are computed off board the missile the fire control system can receive a downlink of the interceptor state (where the interceptor state is computed onboard as discussed previously) or the fire control unit can perceive the missile's state using a sensor such as radar. The missile integrator block 1211 integrates the interceptor forward in time using the interceptor state, 1201, to define the position and speed of the interceptor and either (a) the interceptor state, 1201, for the first iteration of each call to the interceptor guidance function, 320, or (b) the adjusted heading from block 1214 for subsequent iterations, to define the interceptor attitude. The interceptor trajectory from block 1211 is input into the zero effort miss function in block 1212. The n-m likelihoods and n-m propagated target hypotheses, 1203 and 1204 respectively, are input to the "Form BET" function, illustrated as a block 1210. The Form BET block 1210 forms the best estimated trajectory as described in equations 8-10, and outputs a Best Estimated Trajectory (BET) to the zero effort miss function in block 1212. The zero effort miss (ZEM) function in block 1212 determines the distance between the interceptor trajectory and the BET at their point of closest approach and outputs this ZEM. The decision block 1213 determines if the ZEM from block 1212 is above or below a threshold value. If the ZEM is not below a threshold value then the NO path is followed from the decision block 1213 to the Adjust Missile Heading function in block 1214. The adjustment to the heading in block 1214 is performed by an optimization algorithm. The optimization algorithm searches for the initial interceptor heading that minimizes the ZEM. The initial interceptor heading can be defined as (or by) two angles. Such an optimization algorithm searches over possible values of two angles that define the initial heading of the interceptor. The criterion for optimization is the ZEM and the cost function is the missile integrator/BET. Any appropriate optimization scheme (such as Powell's method, Davies Swann and Campey (DSC), steepest descent, etc) or combination of schemes may be employed. Those skilled in the art are familiar with such optimization methods. The improved (because the heading results in a lower ZEM then the previous heading) interceptor heading computed by block 1214 is then used in block 1211 to define the attitude of the interceptor (the interceptor state, 1201, still defines the speed of the interceptor). The loop including the missile integrator 1211, zero effort miss function 1212, decision block 1213, and adjust missile heading function 1214 continues to cycle until such a time as the decision block 1213 indicates that the ZEM is less than a threshold value. Once the ZEM is below a threshold value, the logic leaves decision block 1213 by the YES path and continues to the angle error function represented by block 1217. The angle error function subtracts the initial interceptor heading from the last iteration (1216) from the heading derived from the interceptor initialization information (1202) to compute an angle error. After computing the angle error in the angle error function block (1217) the logic continues to the guidance law function represented by block 1215. The guidance law function uses the difference in the final missile heading, as computed on the last execution of block 1214, to the heading derived from the interceptor state information 1201. The magnitude of the difference between the heading of the interceptor state (derived from 1201) and the adjusted interceptor heading computed on the last execution of the adjust missile heading block 1214 and is the heading error and can be used by an appropriate guidance law to compute acceleration commands to steer the interceptor. Any appropriate guidance law, such as proportional navigation, can be used.

A method for intercepting a ballistic target missile (225a, 225b) in its boost phase comprises the steps of using multiple target hypotheses (in block 312) to estimate the state of the target missile (225a, 225b), and to generate estimated target missile (225a, 225b) states. The estimated target missile (225a, 225b) states are propagated (316) to produce propagated target missile (225a, 225b) states, and an intercept of the target missile (225a, 225b) is planned (318) from the propagated target missile (225a, 225b) states. One mode of this method further comprises the step of guiding an interceptor missile (320) to intercept the target missile (225a, 225b), preferably according to the intercept plan. The step of guiding (320) may include the steps of generating interceptor missile (270) states (324) and propagating (1211) the interceptor missile (270) states. A yet further mode of this method comprises, between the steps of using multiple target hypotheses to estimate the state of the target missile (225a, 225b) and propagating the estimated target missile (225a, 225b) states, the step of estimating the likelihood (314) of a target hypothesis being correct. This step of estimating the likelihood is performed in order to improve the steps of (a) propagating the estimated target missile (225a, 225b) states and (b) planning an intercept of the target missile (225a, 225b).

A method according to another aspect of the invention is for intercepting a target missile (225a, 225b) in its boost phase. The method comprises the steps of generating sensed signals (310) representing the target missile (225a, 225b), and applying the sensed signals to a track filter (312) to generate multiple hypotheses of the target missile (225a, 225b) states. The multiple hypotheses of the target missile (225a, 225b) states are typed to thereby generate likelihoods of the hypotheses being correct. The multiple hypotheses of the target missile (225a, 225b) states are propagated (316) to thereby generate multiple propagated states of the target missile (225a, 225b). An engagement of the target missile (225a, 225b) is planned (318) using the likelihoods, the multiple propagated states, and information relating to at least one available interceptor missile (270). The guidance of the interceptor missile (270) is controlled using the planned engagement, the likelihood information, the multiple propagated states of the target missile (225a, 225b), and interceptor missile state (270) information.

A method according to an aspect of the invention for boost phase engagement planning against target missile(s) (225a, 225b) in its or their boost phase comprises the steps of sensing the target missile(s) (225a, 225b) to produce target-representative signals representing at least target missile (225a, 225b) position, and applying the target-representative signals to a multi-hypothesis filter (312) for producing at least position, velocity, and mass flow rate information defining the state of the target missile(s) (225a, 225b). Ideally, this position, velocity, and mass flow rate information is smoothed. The position, velocity, and mass flow rate information is typed (314) to assign probabilities to various hypotheses of the target missile (225a, 225b) type(s). The state of the target missile(s) (225a, 225b) is propagated forward in time (316) to produce a plurality of propagated target missile (225a, 225b) state hypotheses. An interceptor missile (270) having known characteristics is chosen. An interceptor missile (270) launch time (860) and an estimated time of intercept (830) are chosen from the target missile (225a, 225b) states, the likelihoods, and the known characteristics of the interceptor missile (270). The interceptor missile (270) is launched at the chosen launch time. The interceptor missile (270) is guided (320) to intercept using the probabilities to the various hypotheses of the target missile (225a, 225b) type and the plurality of propagated target missile (225a, 225b) state hypotheses. A particular mode of this method includes, following the step of choosing a launch time and an estimated time to intercept, the further step (319) of initializing the interceptor (270) with initial guidance information derived from the target missile (225a, 225b) states, the likelihoods, and the known characteristics of the interceptor missile (270).

What is claimed is:

1. A method for intercepting a ballistic target missile in its boost phase, said method comprising the steps of:
    using multiple target hypotheses to estimate the state of said target missile, and generate estimated target missile states;
    propagating said estimated target missile states to produce propagated target missile states;
    from said propagated target missile states, planning an intercept of said target missile; and
    further comprising the step of guiding an interceptor missile to intercept said target missile.

2. A method according to claim 1, wherein said step of guiding includes the step of:
    generating interceptor missile states; and
    propagating said interceptor missile states.

3. A method according to claim 1, further comprising, between said steps of using multiple target hypotheses to estimate the state of said target missile and propagating said estimated target missile states, the step of estimating the likelihood of a target hypothesis being correct in order to improve said steps of (a) propagating said estimated target missile states and (b) planning an intercept of said target missile.

4. A method according to claim 3, further comprising the step of guiding said interceptor missile according to said plan to intercept said target missile.

5. A method for intercepting a target missile in its boost phase, said method comprising the steps of:
    generating sensed signals representing the target missile;
    applying said sensed signals to a track filter to generate multiple hypotheses of said target missile states;
    typing said multiple hypotheses of said target missile states to thereby generate likelihoods of the hypotheses being correct;
    propagating said multiple hypotheses of said target missile states to thereby generate multiple propagated states of said target missile;
    using said likelihoods, said multiple propagated states, and information relating to at least one available interceptor missile to plan an engagement by scheduling the launch and intercept times of said target missile;
    using said planned engagement, said likelihood information, said multiple propagated states of said target missile, and interceptor missile state information for controlling the guidance of said interceptor missile.

6. A method for boost phase engagement planning against missiles in their boost phase, said method comprising the steps of:
    sensing a target to produce target-representative signals representing at least target position;
    applying said target-representative signals to a multi-hypothesis filter for producing at least smoothed position, velocity, and mass flow rate information defining the state of said target;
    typing said smoothed position, velocity, and mass flow rate information to assign probabilities to various hypotheses of the missile type;
    propagating the state of said target forward in time to produce a plurality of propagated target state hypotheses;
    choosing an interceptor having known characteristics;
    from the target states, the likelihood, and said known characteristics, choosing a launch time for said interceptor and a estimated time of intercept;

launching said interceptor at the chosen launch time;

guiding said interceptor to intercept using said probabilities to various hypotheses of the missile type and said plurality of propagated target state hypotheses.

7. A method according to claim 6, further comprising the step, following said step of from the target states, the likelihood, and said known characteristics, choosing a launch time for said interceptor and a estimated time of intercept, of initializing said interceptor with initial guidance information derived from said target states, the likelihood, and said known characteristics.

* * * * *